Patented Feb. 25, 1936

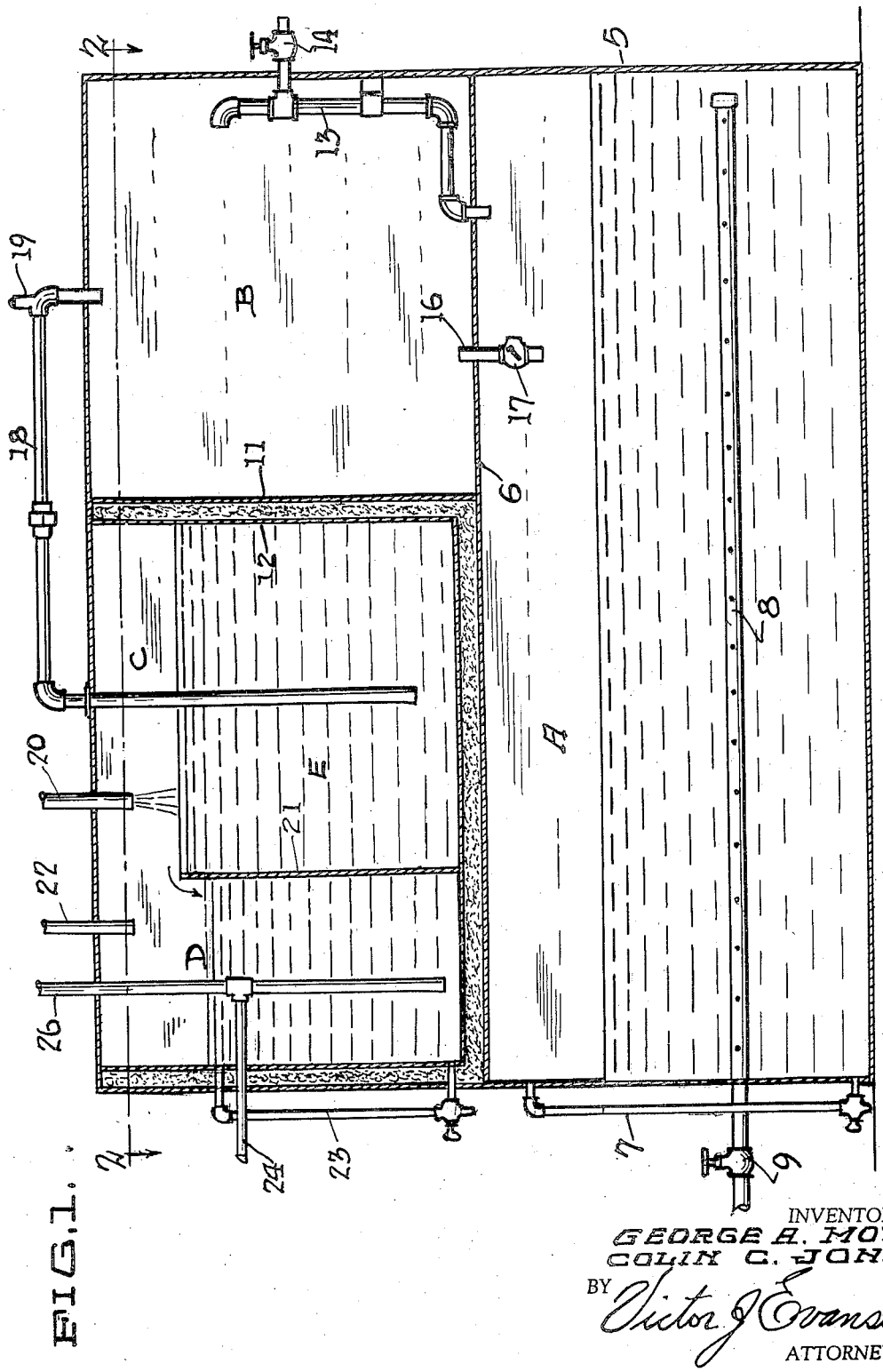

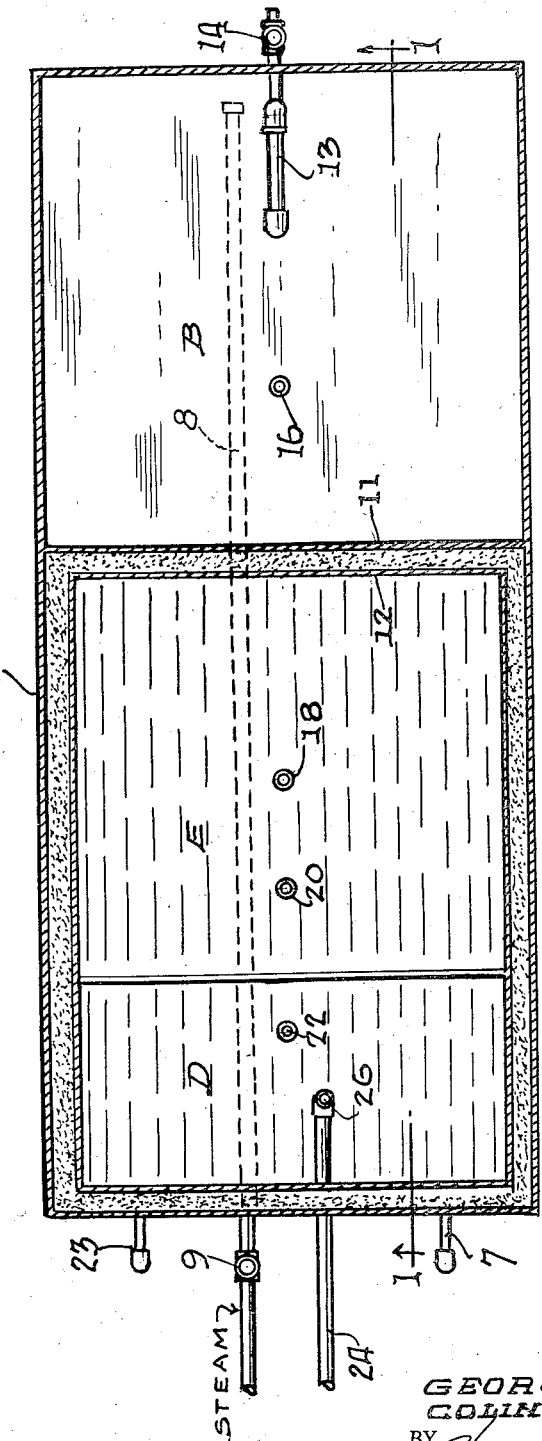

2,032,299

UNITED STATES PATENT OFFICE 2,032,299

SOLVENT RECOVERY DEVICE

George A. Mott and Colin C. Jones, Santa Monica, Calif.; said Jones assignor of his right to Harry S. Lynn, Los Angeles, Calif.

Application December 11, 1934, Serial No. 757,027

3 Claims. (Cl. 196—15)

This invention relates to improvements in solvent recovery devices and has particular reference to a device for removing and recovering solvent from the ordinary sludge found in the settling tanks of cleaners' vats.

The principal object of the invention is to produce a device which will remove from the sludge, a large percentage of the solvent which is contained therein at a minimum cost of operation, and to also recover a solvent which may be used again, which solvent is clear and free from objectionable odors and color.

A further object is to produce a device which is economical to install and simple to operate.

A still further object is to produce a device wherein the solvent will retain all of its characteristics and will, therefore, not be spoiled by the recleaning process.

Other objects and advantages will be apparent during the course of the following description.

In the accompanying drawings forming a part of this specification and in which like numerals are employed to designate like parts throughout the same, Fig. 1 is a vertical cross section taken on the line 1—1 of Fig. 2, and Fig. 2 is a horizontal cross section taken on the line 2—2 of Fig. 1.

In the process of cleaning clothes, particularly that type of cleaning referred to as dry cleaning, the cleaner immerses the clothes in a washing machine like arrangement, which contains a solvent (commonly called in the trade, gas), soap, or ammonia, and after the clothes have been thoroughly washed in this solution, the solution is run off as it is at this time very dirty and the clothes are then placed in a centrifugal wringer and the liquid obtained therefrom is also run off. These two run-offs of liquid are caught in a settling vat and caustic solution added and a saponifaction occurs, and after due time the clear liquid which rises to the top is drawn off from the settling vat, while the dirt and sludge near the bottom thereof is discarded. As this sludge contains a large amount of valuable solvent, and in large plants the amount of sludge thrown away each day results in a considerable loss to the establishment. Applicants have, therefore, devised an apparatus whereby a certain process of treatment of the sludge will remove from the sludge the greater part of the solvent contained therein and will refine this solvent to such a degree that it will be clear, free from obnoxious odors and capable of being reused.

In the accompanying drawings wherein for the purpose of illustration is shown a preferred embodiment of our invention, the numeral 5 designates a substantially rectangular tank preferably divided horizontally by a partition 6, thus is formed a chamber A. A sight glass 7 connects the top and bottom of this chamber A so that the contents of the chamber may be readily discerned. As soon as all the solvent has been separated from the sludge in tank A sludge commences to slop over into the top of the sight gauge 7 thereby communicating to the operator that the solvent in this batch has been extracted, the process finished and the sludge ready to be dumped out. At 8 I have shown a perforated steam pipe through which steam is admitted through a valve 9. The upper portion of the tank 5 is divided into two compartments by a wall 11, thus forming chambers B and C. The chamber C is insulated from the chambers A and B by a double wall and asbestos lining 12. An open pipe 13 has one end communicating with the chamber A and has its upper end communicating with the chamber B. An inspection valve 14 is connected to the pipe 13. A return pipe 16 having a one-way valve 17, extends through the horizontal partition 6 and forms a one-way communication from the chamber B to the chamber A. A pipe 18 has one end communicating with the upper portion of the chamber B and has its opposite end in close proximity to the bottom of the chamber C. A pop valve 19 is included in this pipe line.

Within the chamber C is a vertical partition 21, extending from the bottom of the chamber to a point slightly below the top of the chamber, thus dividing the chamber C into two receptacles D and E, the lower end of the pipe 18 extending into the lower portion of the receptacle E. A water pipe 20 is so positioned as to discharge hot water into the receptacle E. A vent pipe is shown at 22 and a sight glass is shown at 23 connecting to the top and bottom of the receptacle D. An overflow pipe extends into the receptacle D and has a discharge 24 and a vent 26.

The operation of our device is as follows:—

Assuming that the sludge, which is a dirty liquid mass, is introduced into the chamber A, the valve 9 is now opened and steam at a low temperature is introduced. The water vapor in the steam, together with the water in the sludge, will rise and pass through the pipe 13 carrying with it globules of solvent. It might be here said that it is important to keep the temperature of the sludge at not more than 212 degrees F., because if a higher temperature than 212 degrees F. is reached, it will burn the fats and soaps and greases, thereby discoloring the solvent and giving it a bad odor. In the chamber B the vapor issuing from the pipe 13 moves about in a turbulent stream dropping any heavier particles which may have come over, which particles will return through the pipe 16 to the chamber A. The vapor in the chamber B may pass through the pipe 18 and into the chamber C, issuing from the bottom of the pipe 18 through the water in the receptacle E. As the solvent is lighter than the water it will naturally float to the top of the water in the receptacle E and will flow over the partition 21 with excess water issuing from the pipe 20. This solvent will now float upon the top of the receptacle D, and as the discharge pipe 24 is below the top of the partition 21, it will be obvious that the water in the bottom part of the receptacle D will flow by gravity out of the pipe 24, thus keeping the level in the receptacle D always below the level in the receptacle E. Also as the water is being withdrawn from the bottom it will be apparent that as the amount of recovered solvent accumulates in the receptacle D the bottom of the solvent level will move downwardly until it reaches the bottom of the pipe 26. At this time the attendant stops the flow of water from the pipe 20 and withdraws from the receptacle D, through a valve not shown, the recovered solvent.

It will thus be seen that we have produced an apparatus which, when operated in the manner described, will recover from the sludge, the solvent carried therein, which has heretofore been impossible as may be proven by various articles appearing in the trade magazines.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a device of the character described, capable of separating a solvent from sludge, a tank, a horizontal partition formed in said tank, a portion of said tank above said partition being divided into a pair of chambers, one of said chambers being insulated from the other of said chambers, live steam heating means for generating vapors in the lower portion of said tank, means for transferring said steam and said vapors to the un-insulated chamber of said tank, means for passing said steam and said vapors to said insulated chamber, and washing means for separating said steam and said vapor so as to wash and remove the lighter solvents from said steam.

2. In a device of the character described for recovering solvent from sludge, comprising a tank having a horizontal partition therein dividing said tank into a lower chamber, a vertical partition dividing the upper portion of said tank into a pair of chambers, one of said pair of chambers being insulated from the other of said chambers of said tank, a vertical partition formed in said insulated chamber, means for discharging water to one side of said last mentioned vertical partition, live steam heating means for transferring vapor from said first mentioned chamber to said uninsulated chamber above said horizontal partition, means for transferring said steam and said vapor from said last mentioned chamber to a point adjacent the bottom of said insulated chamber and upon one side of said vertical partition in said insulated chamber, and at a point below the surface of the water therein, whereby said steam and vapor will be condensed and said vapor washed and means for discharging fluid from the opposite side of said vertical partition said discharge means serving to separate said wash water and said condensed vapor.

3. A device of the character described for recovering solvent from sludge comprising a tank, a trapping chamber mounted above said tank, means for introducing live steam into sludge contained in the first mentioned tank, means for conveying said steam and vapor arising therefrom to said trap chamber, return means from said trap chamber to said tank for conducting solids from said trap chamber to said tank, an insulated tank mounted adjacent said first mentioned tank, means for conducting said steam and said vapor from said trap chamber to said insulated tank, and means for condensing said steam and vapor, said means including a divided water receptacle into which said steam and vapor are discharged, the height of the water in one of said receptacles being greater than that in the other, and means for drawing off fluid from the receptacle having the least fluid height.

GEORGE A. MOTT.
COLIN C. JONES.